(12) United States Patent
Elnozahy et al.

(10) Patent No.: US 8,589,895 B2
(45) Date of Patent: Nov. 19, 2013

(54) ARCHITECTURAL SUPPORT FOR AUTOMATED ASSERTION CHECKING

(75) Inventors: Elmootazbellah N. Elnozahy, Austin, TX (US); Mark W. Stephenson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 980 days.

(21) Appl. No.: 12/686,643

(22) Filed: Jan. 13, 2010

(65) Prior Publication Data
US 2011/0173592 A1    Jul. 14, 2011

(51) Int. Cl.
G06F 9/45    (2006.01)

(52) U.S. Cl.
USPC ........................................................ 717/131

(58) Field of Classification Search
USPC ......................................................... 717/131
See application file for complete search history.

(56) References Cited

U.S. PATENT DOCUMENTS

| | | | |
|---|---|---|---|
| 5,664,137 A | 9/1997 | Abramson et al. | |
| 7,003,698 B2 * | 2/2006 | Glass | 714/30 |
| 7,269,718 B2 * | 9/2007 | Alexander et al. | 712/221 |
| 7,328,374 B2 * | 2/2008 | Alexander et al. | 714/42 |
| 8,131,532 B2 * | 3/2012 | Cadambi et al. | 703/22 |
| 8,336,034 B2 * | 12/2012 | Sinha | 717/131 |
| 2005/0251707 A1 * | 11/2005 | Alexander et al. | 714/49 |
| 2006/0253739 A1 * | 11/2006 | Godefroid et al. | 714/38 |
| 2008/0229156 A1 * | 9/2008 | Alexander et al. | 714/48 |
| 2010/0094611 A1 * | 4/2010 | Sankaranarayanan et al. | 703/22 |
| 2010/0281469 A1 * | 11/2010 | Wang et al. | 717/128 |
| 2011/0167416 A1 * | 7/2011 | Sager et al. | 717/149 |
| 2012/0060199 A1 * | 3/2012 | Lerner et al. | 726/1 |

OTHER PUBLICATIONS

Wahbe, Robert et al., "Practical Data Breakpoints: Design and Implementation", ACM SIGPLAN/93, Symposium on Programming Language Design and Implementation, Albuquerque, New Mexico, Jun. 23-25, 1993, pp. 1-12.
International Search Report and Written Opinion dated Apr. 19, 2011 for International Application No. PCT/EP2011/050153, 13 pages.
"Chapter 6, Assertion facility", In: Greg Travis: "JDK 1.4 Tutorial", May 2002, Manning Publications, pp. 171-204.
Alexandrescu, Andrei et al., "Enhancing Assertions", Dr. Dobb's The World of Software Development, Aug. 1, 2003, retrieved from the Internet on Apr. 7, 2011: http://drdobbs.com/184403745, 8 pages.
Clarke, Lori A. et al., "A Historical Perspective on Runtime Assertion Checking in Software Development", ACM SIGSOFT Software Engineering Notes, vol. 31, No. 3, May 2006, pp. 25-37.

* cited by examiner

*Primary Examiner* — John Chavis
(74) *Attorney, Agent, or Firm* — Stephen R. Tkacs; Stephen J. Walder, Jr.; Eustus D. Nelson

(57) ABSTRACT

A mechanism is provided for automatic detection of assertion violations. An application may write assertion tuples to the assertion checking mechanism. An assertion tuple forms a Boolean expression (predicate or invariant) that the developer of the application wishes to check. If the assertion defined by the tuple remains true, then the application does not violate the assertion. For any instruction that stores a value to a memory location or register at a target address, the assertion checking mechanism compares the target address to the addresses specified in the assertion tuples. If the target address matches one of the tuple addresses, then the assertion checking mechanism reads a value from the other address in the tuple. The assertion checking mechanism then recomputes the assertion using the retrieved value along with the value to be stored. If the assertion checking mechanism detects an assertion violation, the assertion checking mechanism raises an exception.

20 Claims, 3 Drawing Sheets

| 000 | + |
| --- | --- |
| 001 | - |
| 010 | * |
| 011 | / |
| 100 | \| |
| 101 | & |
| 110 | ^ |
| 111 | % |

| 000 | = |
| --- | --- |
| 001 | != |
| 010 | ≤ |
| 011 | ≥ |
| 100 | < |
| 101 | > |

ARCHITECTURAL SUPPORT FOR AUTOMATED ASSERTION CHECKING

BACKGROUND

The present application relates generally to an improved data processing apparatus and method and more specifically to an apparatus and method for automated assertion checking with architectural support.

In computer programming, an assertion is a predicate (i.e., a true/false statement) placed in a program to indicate that the developer thinks that the predicate is always true at that place. An assertion may be used to verify that an assumption made by the programmer during the implementation of the program remains valid when the program is executed. The process of determining whether assertions remain valid during runtime is referred to as "assertion checking." An advantage of assertion checking is that when an error occurs, it is detected immediately and directly rather than later through its often obscure side-effects. Because an assertion failure usually reports the code location, one may pin-point the error without further debugging.

Inserting assertion checking into a program can slow execution down by 10-30%, or more. If the developer forgets to remove assertion checking from the program, execution may continue to perform unnecessary assertion checking, thus resulting in poor performance. Other human error may affect assertion checking itself. For example, a developer may forget to recompute an assertion after the constituent variables change. Also, assertions could be violated silently in a language that uses undisciplined pointers (e.g., C and C++ programming languages).

SUMMARY

In one illustrative embodiment, a method, in a data processing system, is provided for automatic detection of assertion violations. The method comprises receiving a set of assertion tuples from an application. Each assertion tuple within the set of assertion tuples defines an assertion. Each assertion tuple comprises at least one address, a condition, and a value. The method comprises responsive to an instruction in the application storing a value to a target address, comparing the target address to the at least one address in each assertion tuple in the set of assertion tuples. The method further comprises responsive to the target address matching an address in a given tuple, recomputing the assertion of the given tuple using the value to be stored, the condition, and the value of the given tuple, and responsive to the recomputed assertion being false, raising an exception.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide an assertion checking mechanism for automatic detection of assertion violations. An application may write assertion tuples to the assertion checking mechanism. An assertion tuple comprises a collection of registers that contain two addresses, an operator, a condition, and a value. An assertion tuple forms a Boolean expression (predicate or invariant) that the developer of the application wishes to check. If the assertion defined by the tuple remains true, then the application does not violate the assertion. However, if the assertion is false, then the assertion checking mechanism detects an assertion violation.

For any instruction that stores a value to a memory location or register at a target address, the assertion checking mechanism compares the target address to the addresses specified in the assertion tuples. If the target address matches one of the tuple addresses, then the assertion checking mechanism reads a value from the other address in the tuple. The assertion checking mechanism then recomputes the assertion using the retrieved value along with the value to be stored. If the assertion checking mechanism detects an assertion violation, the assertion checking mechanism raises an exception. The application may take over with an exception handling routine. Alternatively, the processor may comprise a hardware exception handler. In one example embodiment, the assertion checking mechanism may simply terminate execution of the application or invoke the debugger.

Figure 1:
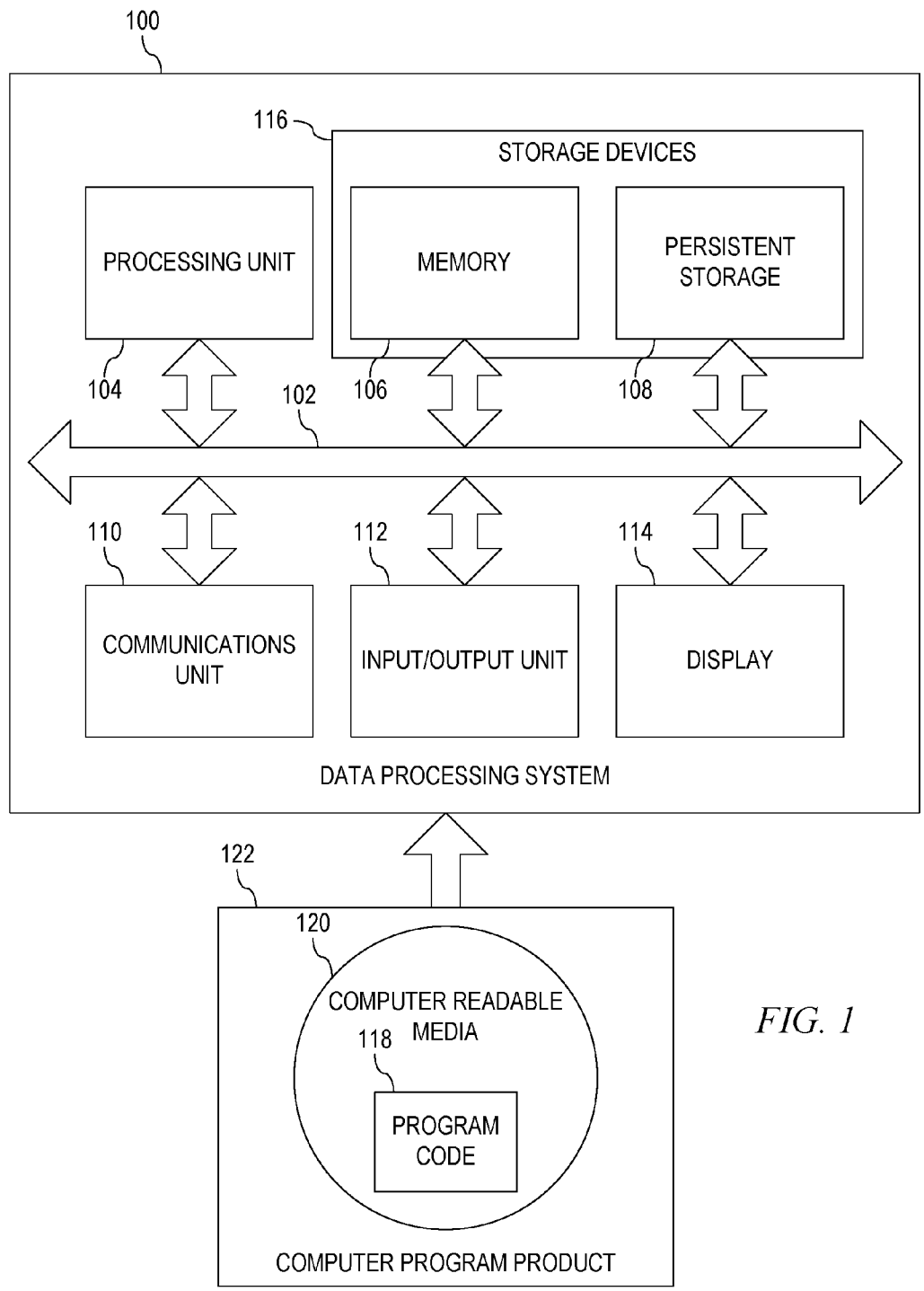
FIG. 1 depicts a block diagram of a data processing system in which illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIG. 1 is provided hereafter as an example environment in which aspects of the illustrative embodiments may be implemented. While the description following FIG. 1 will focus primarily on a single data processing device implementation, this is only an example and is not intended to state or imply any limitation with regard to the features of the present invention. To the contrary, the illustrative embodiments are intended to include distributed data processing environments and embodiments in which an assertion checking mechanism automatically detects assertion violations.

With reference now to the figures and in particular with reference to FIG. 1, an example diagram of a data processing environment is provided in which illustrative embodiments of the present invention may be implemented. It should be appreciated that FIG. 1 is only an example and is not intended to assert or imply any limitation with regard to the environments in which aspects or embodiments of the present invention may be implemented. Many modifications to the depicted environment may be made without departing from the spirit and scope of the present invention.

FIG. 1 depicts a block diagram of a data processing system in which illustrative embodiments may be implemented. Data processing system 100 is an example of a computer, in which computer usable program code or instructions implementing the processes may be located for the illustrative embodiments. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As an example, a storage device in data processing system 100 is any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Figure 2:
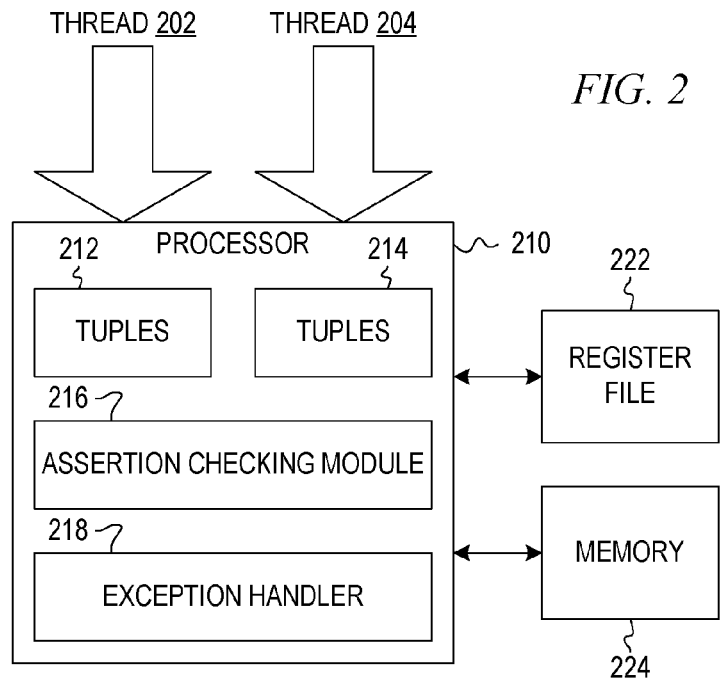
FIG. 2 is a block diagram depicting a processor with an assertion checking module in accordance with an illustrative embodiment.

FIG. 2 is a block diagram depicting a processor with an assertion checking module in accordance with an illustrative embodiment. Processor 210 runs threads 202 and 204. Processor reads to and writes from register file 222 and memory 224. Register file 222 is an array of processor registers in processor 210. In one embodiment, register file 222 may be a static random access memory (SRAM) within processor 210. Memory 224 may be a dynamic random access memory (DRAM) and may be shared among a plurality of processors.

Processor 210 comprises assertion checking module 216. Thread 202 writes assertion tuples 212 and thread 204 writes assertion tuples 214. Tuples 212 and 214 may be stored in register file 222 or may be stored in dedicated memory cells associated with assertion checking module 216, for example. Processor 210 may store a set of assertion tuples for each thread 202, 204.

As an example, thread 202 may write assertion tuples 212 to assertion checking module 216. An assertion tuple comprises a collection of registers that contain two addresses, an operator, a condition, and a value. An assertion tuple forms a Boolean expression (predicate or invariant) that the developer of the application of thread 202 wishes to check. If the assertion defined by the tuple remains true, then thread 202 does not violate the assertion. However, if the assertion is false, then assertion checking module 216 detects an assertion violation.

For any instruction within thread 202 that stores a value to a memory location or register at a target address, assertion checking module 216 compares the target address to the addresses specified in assertion tuples 212. If the target address matches one of the tuple addresses, then assertion checking module reads a value for the other address in the tuple, if specified, from register file 222 or memory 224. In many cases, the assertion checks will be simple (e.g., contents [ADDR0]<100). In these scenarios there will be no need to specify an OP or a secondary address. This can be indicated easily by setting the second address in the tuple to 0.

Assertion checking module then recomputes the assertion using the retrieved value along with the value to be stored. If assertion checking module 216 detects an assertion violation, then assertion checking module 216 raises an exception. The application may take over with an exception handling routine. Alternatively, processor 210 may comprise hardware exception handler 218. Thus, hardware exception handler 218 may receive the exception and perform an action in response to the assertion violation. In one example embodiment, assertion checking module 216 may simply terminate execution of the application.

FIG. 2 shows the assertion checking module 216 as being embodied within processor 210. In an alternative embodiment, assertion checking module 216 may exist outside processor 210. For example, assertion checking module 216 may be associated with a bus (not shown) and may snoop the instruction stream as processor 210 reads instructions for threads 202, 204 from memory 224.

Figure 3:
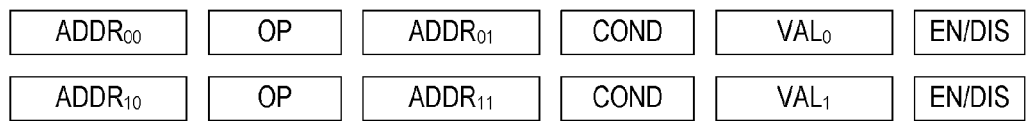
FIG. 3 illustrates a set of assertion tuples in accordance with an illustrative embodiment.

FIG. 3 illustrates a set of assertion tuples in accordance with an illustrative embodiment. Each tuple comprises two addresses (e.g., $ADDR_{00}$ and $ADDR_{01}$), an operator (OP), a condition (COND), and a value (e.g., $VAL_0$). The addresses may be for a register or a memory location, for example. In the example shown in FIG. 3, the operator may be one of addition (+), subtraction (−), multiplication (*), division (/), bit-wise OR (|), bit-wise AND (&), bit-wise XOR (^), or modulus. However, the operator may include more or fewer operators depending upon the implementation. In the depicted example, the condition may be one of equal (=), not equal (!=), less than or equal (≤), greater than or equal (≥), less than (<), or greater than (>). The condition may include more or fewer operators depending upon the implementation.

One useful operator is a "range" operator that would have different semantics from the operators mentioned here. The range operator would ensure that the value written to the range of addresses from ADDRX0-ADDRX1 satisfied the condition: contents_in[ADDRX0-ADDRX1] COND VAL. This would allow one to track all writes to a huge in-memory matrix, for instance, with a single assertion tuple.

As stated above, an assertion tuple, such as the assertion tuples shown in FIG. 3, may form a Boolean expression (predicate or invariant) that the developer of the application wishes to check. If the assertion defined by the tuple remains true, then the application does not violate the assertion. However, if the assertion is false, then the assertion checking mechanism detects an assertion violation.

In one example embodiment, an assertion tuple may comprise an enable/disable (EN/DIS) bit. The thread may assert or de-assert the enable/disable bit to turn an assertion check on or off. Thus, the assertion checking mechanism may check an assertion for one portion of code and ignore the assertion for the remainder of the application.

As will be appreciated by one skilled in the art, the present invention may be embodied as a system, method, or computer program product. Accordingly, the present invention may take the form of an entirely hardware embodiment or an embodiment combining software (including firmware, resident software, micro-code, etc.) and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc., or any suitable combination thereof.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In addition, the program code may be embodied on a computer readable storage medium on the server or the remote computer and downloaded over a network to a computer readable storage medium of the remote computer or the users' computer for storage and/or execution. Moreover, any of the computing systems or data processing systems may store the program code in a computer readable storage medium after having downloaded the program code over a network from a remote computing system or data processing system.

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
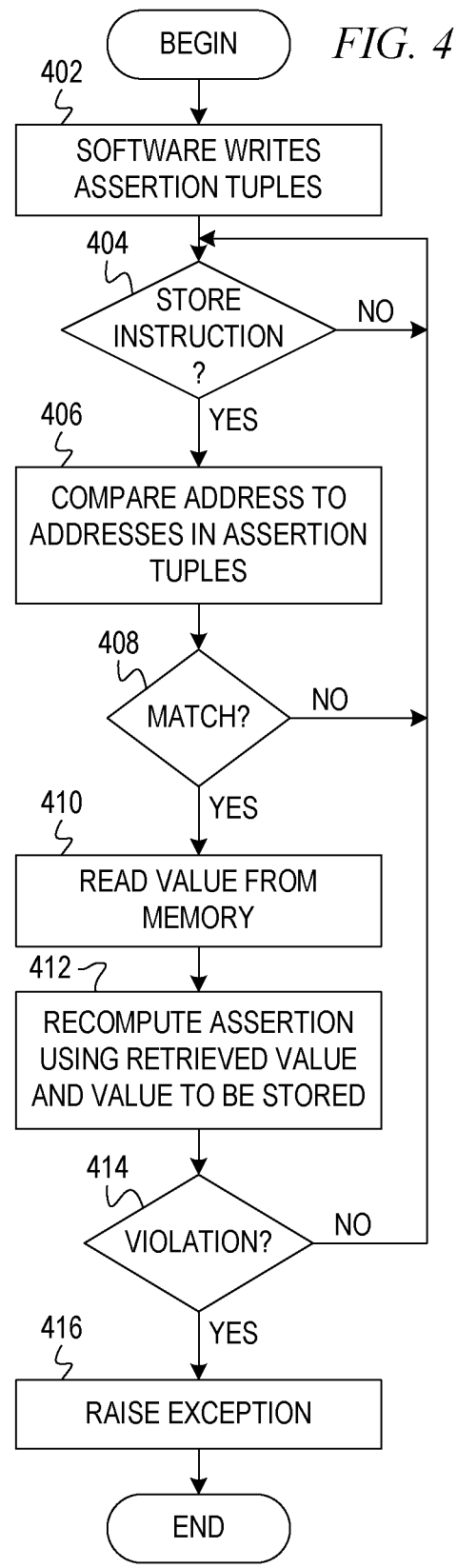
FIG. 4 is a flowchart outlining example operations of an assertion checking mechanism in a data processing system in accordance with an illustrative embodiment.

FIG. 4 is a flowchart outlining example operations of an assertion checking mechanism in a data processing system in accordance with an illustrative embodiment. Operation begins, and the software application writes assertion tuples to the assertion checking mechanism (block 402). The assertion checking mechanism determines whether a store instruction is encountered in the application instructions (block 404). If the assertion checking mechanism does not encounter a store instruction in the application instructions, operation returns to block 404 to determine whether a store instruction is encountered.

If the assertion checking mechanism encounters a store instruction, the assertion checking mechanism compares the target address of the store instruction to the addresses in the assertion tuples associated with the application thread (block 406). The assertion checking mechanism then determines whether the target address matches one of the addresses in the assertion tuples (block 408). If the target address does not match the addresses in the assertion tuples, then operation returns to block 404 to determine whether a store instruction is encountered.

If the target address matches one of the addresses in the assertion tuples in block 408, then the assertion checking mechanism reads the value from memory for the other address in the tuple (block 410) and recomputes the assertion using the retrieved value, the value to be stored, and the operator, condition, and value of the tuple (block 412). The assertion checking mechanism then determines whether the assertion results in a violation (block 414). If the assertion does not result in a violation, then operation returns to block 404 to determine whether a store instruction is encountered.

If the assertion is not valid in block 414, the assertion checking mechanism raises an exception (block 416). The assertion checking mechanism may send the exception to the application responsive to which the application may run an exception handler. Alternatively, the assertion checking mechanism may send the exception to a hardware exception handler within the processor. In another embodiment, the assertion checking mechanism may simply terminate execution of the application or invoke a debugger. Thereafter, operation ends.

Thus, the illustrative embodiments provide mechanisms for automatic detection of assertion violations. An application may write assertion tuples to the assertion checking mechanism. An assertion tuple comprises a collection of registers that contain two addresses, an operator, a condition, and a value. An assertion tuple forms a Boolean expression (predicate or invariant) that the developer of the application wishes to check. If the assertion defined by the tuple remains true, then the application does not violate the assertion. However, if the assertion is false, then the assertion checking mechanism detects an assertion violation.

For any instruction that stores a value to a memory location or register at a target address, the assertion checking mechanism compares the target address to the addresses specified in the assertion tuples. If the target address matches one of the tuple addresses, then the assertion checking mechanism reads a value from the other address in the tuple. The assertion checking mechanism then recomputes the assertion using the retrieved value along with the value to be stored. If the assertion checking mechanism detects an assertion violation, the assertion checking mechanism raises an exception. The application may take over with an exception handling routine. Alternatively, the processor may comprise a hardware exception handler. In one example embodiment, the assertion checking mechanism may simply terminate execution of the application.

As noted above, it should be appreciated that the illustrative embodiments may take the form of an entirely hardware embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for automatic detection of assertion violations, the method comprising:
   receiving a set of assertion tuples from an application, wherein each assertion tuple within the set of assertion tuples defines an assertion; wherein each assertion tuple comprises at least one address, a condition, and a value;
   responsive to an instruction in the application storing a value to a target address, comparing the target address to the at least one address in each assertion tuple in the set of assertion tuples;
   responsive to the target address matching an address in a given tuple, recomputing the assertion of the given tuple using the value to be stored, the condition, and the value of the given tuple; and
   responsive to the recomputed assertion being false, raising an exception.

2. The method of claim 1, wherein each assertion tuple comprises a first address, an operator, a second address, the condition and the value.

3. The method of claim 2, wherein comparing the target address to the at least one address in each assertion tuple in the set of assertion tuples comprises:
   comparing the target address to the first address and the second address in each assertion tuple in the set of assertion tuples.

4. The method of claim 3, further comprising:
   responsive to the target address matching one of the first address or the second address in a given tuple, recomputing the assertion using the value to be stored to the one of the first address or the second address, the operator, a value stored at the other of the first address or the second address, the condition, and the value of the given tuple.

5. The method of claim 2, wherein the operator comprises one of addition, subtraction, multiplication, division, bit-wise OR, bit-wise AND, bit-wise XOR, modulus, or range.

6. The method of claim 1, wherein the condition comprises one of equal, not equal, less than or equal, greater than or equal, less than, or greater than.

7. The method of claim 1, wherein each assertion tuple comprises an enable bit and wherein comparing the target address to the at least one address in each assertion tuple in the set of assertion tuples comprises comparing the target address to the at least one address in each tuple having its enable bit set.

8. A computer program product comprising a non-transitory computer readable storage medium having a computer readable program stored therein, wherein the computer readable program, when executed on a computing device, causes the computing device to:
   receive a set of assertion tuples from an application, wherein each assertion tuple within the set of assertion tuples defines an assertion; wherein each assertion tuple comprises at least one address, a condition, and a value;
   responsive to an instruction in the application storing a value to a target address, compare the target address to the at least one address in each assertion tuple in the set of assertion tuples;
   responsive to the target address matching an address in a given tuple, recompute the assertion of the given tuple using the value to be stored, the condition, and the value of the given tuple; and
   responsive to the recomputed assertion being false, raise an exception.

9. The computer program product of claim 8, wherein each assertion tuple comprises a first address, an operator, a second address, the condition and the value.

10. The computer program product of claim 9, wherein comparing the target address to the at least one address in each assertion tuple in the set of assertion tuples comprises:
    comparing the target address to the first address and the second address in each assertion tuple in the set of assertion tuples.

11. The computer program product of claim 10, wherein recomputing the assertion of the given tuple comprises:
    responsive to the target address matching one of the first address or the second address in a given tuple, recomputing the assertion using the value to be stored to the one of the first address or the second address, the operator, a value stored at the other of the first address or the second address, the condition, and the value of the given tuple.

12. The computer program product of claim 9, wherein the operator comprises one of addition, subtraction, multiplication, division, bit-wise OR, bit-wise AND, bit-wise XOR, modulus, or range.

13. The computer program product of claim 8, wherein the condition comprises one of equal, not equal, less than or equal, greater than or equal, less than, or greater than.

14. The computer program product of claim 8, wherein each assertion tuple comprises an enable bit and wherein comparing the target address to the at least one address in each assertion tuple in the set of assertion tuples comprises comparing the target address to the at least one address in each tuple having its enable bit set.

15. The computer program product of claim 8, wherein the computer readable program is stored in a computer readable storage medium in a data processing system and wherein the computer readable program was downloaded over a network from a remote data processing system.

16. The computer program product of claim 8, wherein the computer readable program is stored in a computer readable storage medium in a server data processing system and wherein the computer readable program is downloaded over a network to a remote data processing system for use in a computer readable storage medium with the remote system.

17. An apparatus, comprising:
a processor; and
a memory coupled to the processor, wherein the memory comprises instructions which, when executed by the processor, cause the processor to:
receive a set of assertion tuples from an application, wherein each assertion tuple within the set of assertion tuples defines an assertion; wherein each assertion tuple comprises at least one address, a condition, and a value;
responsive to an instruction in the application storing a value to a target address, compare the target address to the at least one address in each assertion tuple in the set of assertion tuples;
responsive to the target address matching an address in a given tuple, recompute the assertion of the given tuple using the value to be stored, the condition, and the value of the given tuple; and
responsive to the recomputed assertion being false, raise an exception.

18. The apparatus of claim 17, wherein each assertion tuple comprises a first address, an operator, a second address, the condition and the value.

19. The apparatus of claim 18, wherein the operator comprises one of addition, subtraction, multiplication, division, bit-wise OR, bit-wise AND, hit-wise XOR, modulus, or range.

20. The apparatus of claim 17, wherein the condition comprises one of equal, not equal, less than or equal, greater than or equal, less than, or greater than.

* * * * *